(12) United States Patent
Guo et al.

(10) Patent No.: US 12,449,976 B2
(45) Date of Patent: Oct. 21, 2025

(54) PASID GRANULARITY RESOURCE CONTROL FOR IOMMU

(71) Applicant: Intel Corporation, Santa Clara, CA (US)

(72) Inventors: Kaijie Guo, Shanghai (CN); Ashok Raj, Portland, OR (US); Ned Smith, Beaverton, OR (US); Weigang Li, Shanghai (CN); Junyuan Wang, Shanghai (CN); Xin Zeng, Shanghai (CN); Brian Will, Phoenix, AZ (US); Zijuan Fan, Shanghai (CN); Michael E. Kounavis, Portland, OR (US); Qianjun Xie, Shanghai (CN); Yuan Wang, Nantong (CN); Yao Huo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/239,363

(22) Filed: Aug. 29, 2023

(65) Prior Publication Data
US 2023/0409197 A1 Dec. 21, 2023

Related U.S. Application Data

(63) Continuation of application No. PCT/CN2021/082908, filed on Mar. 25, 2021.

(51) Int. Cl.
*G06F 3/06* (2006.01)

(52) U.S. Cl.
CPC ........... *G06F 3/061* (2013.01); *G06F 3/0655* (2013.01); *G06F 3/0673* (2013.01)

(58) Field of Classification Search
None
See application file for complete search history.

(56) References Cited

U.S. PATENT DOCUMENTS 10,491,584 B2    11/2019    Tewari et al.
2013/0080714 A1*  3/2013   Kegel ............... G06F 12/1081
                                                   711/E12.001

(Continued)

OTHER PUBLICATIONS

International Search Report and Written Opinion from PCT/CN2021/082908 notified Mar. 4, 2022, 9 pgs.

(Continued)

*Primary Examiner* — Ryan Bertram
*Assistant Examiner* — Edmund H Kwong
(74) *Attorney, Agent, or Firm* — Essential Patents Group, LLP

(57) ABSTRACT

An embodiment of an integrated circuit may comprise memory to store respective resource control descriptors in correspondence with respective identifiers, and an input/output (IO) memory management unit (IOMMU) communicatively coupled to the memory, the IOMMU including circuitry to determine resource control information for an IO transaction based on a resource control descriptor stored in the memory that corresponds to an identifier associated with the IO transaction, and control utilization of one or more resources of the IOMMU based on the determined resource control information. Other embodiments are disclosed and claimed.

17 Claims, 16 Drawing Sheets

(56) References Cited

U.S. PATENT DOCUMENTS

2013/0138840 A1* 5/2013 Kegel .................. G06F 12/109
                                                    710/22
2018/0203807 A1* 7/2018 Krueger ............. G06F 12/0842
2019/0042463 A1   2/2019 Shanbhogue et al.
2019/0377687 A1* 12/2019 Raisch ................ G06F 12/1441
2019/0384722 A1* 12/2019 Basu .................. G06F 11/3471
2020/0320017 A1  10/2020 Lakshman et al.
2021/0004338 A1   1/2021 Morolia et al.

OTHER PUBLICATIONS

International Preliminary Report on Patentability from PCT/CN2021/082908 notified Oct. 5, 2023, 6 pgs.
Extended European Search Report from European Patent Application No. 21932176.7 notified Nov. 7, 2024, 9 pgs.

* cited by examiner

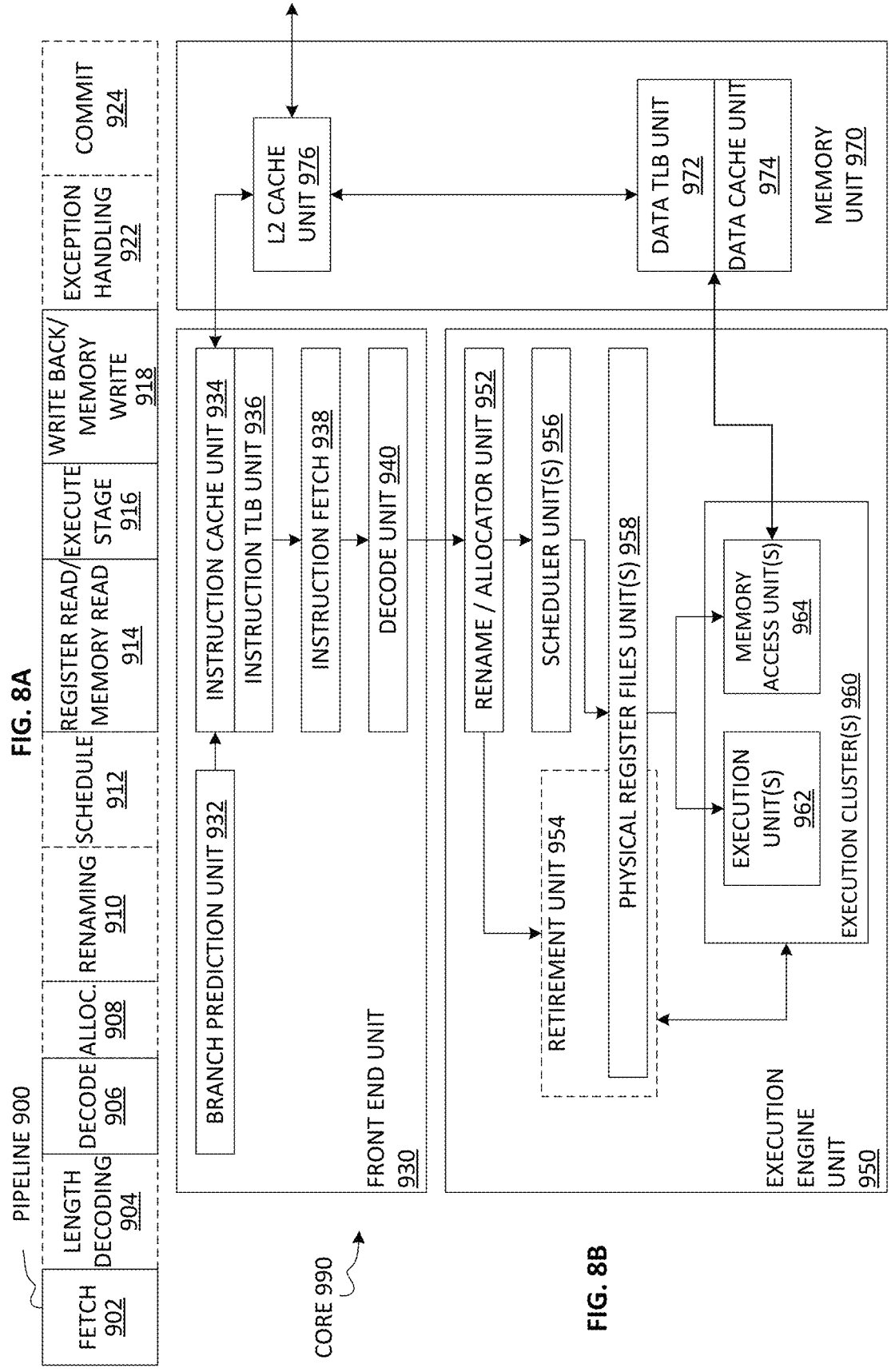

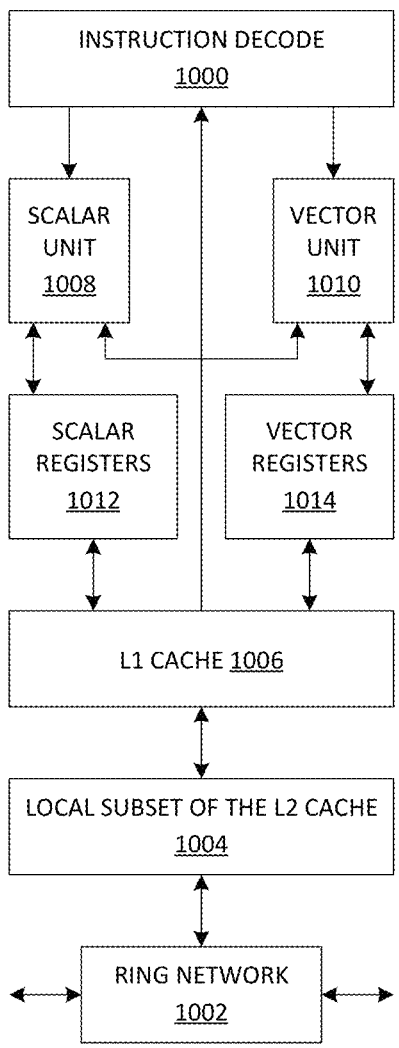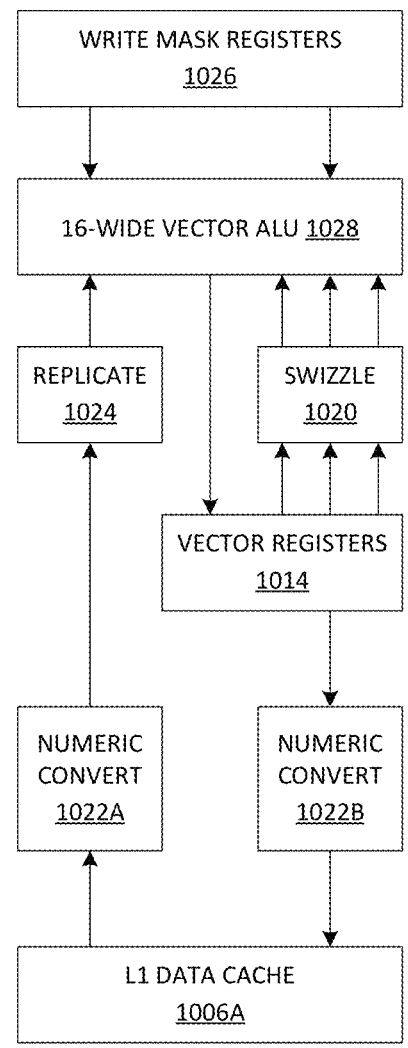
FIG. 9A
FIG. 9B

… (1/2)

PASID GRANULARITY RESOURCE CONTROL FOR IOMMU

CLAIM OF PRIORITY

This application is a continuation of, and claims priority to, PCT Application No. PCT/CN2021/082908, filed on Mar. 25, 2021 and titled "PASID GRANULARITY RESOURCE CONTROL FOR IOMMU," which is incorporated herein by reference in its entirety.

BACKGROUND

1. Technical Field

This disclosure generally relates to processor technology, and input/output memory management unit technology.

2. Background Art

An input/output (IO) memory management unit (IOMMU) connects direct memory access (DMA) capable IO buses to system memory (e.g., main memory). A central processor unit (CPU) memory management (MMU) translates CPU-visible virtual addresses to physical addresses. An IOMMU brokers any DMA request on behalf of an IO device, translating IO virtual addresses much the same way as the processor MMU complex performs translation of a virtual address to physical address. Some IOMMUs may also provide memory protection from faulty or malicious devices.

INTEL VIRTUALIZATION TECHNOLOGY (INTEL VT) provides hardware support for efficient virtual machines. INTEL VIRTUALIZATION TECHNOLOGY FOR DIRECTED I/O (VT-d) provides support for IO-device virtualization.

BRIEF DESCRIPTION OF THE DRAWINGS

The various embodiments of the present invention are illustrated by way of example, and not by way of limitation, in the figures of the accompanying drawings and in which:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention;

FIGS. 9A-B illustrate a block diagram of a more specific exemplary in-order core architecture, which core would be one of several logic blocks (including other cores of the same type and/or different types) in a chip;

DETAILED DESCRIPTION

Figure 1:
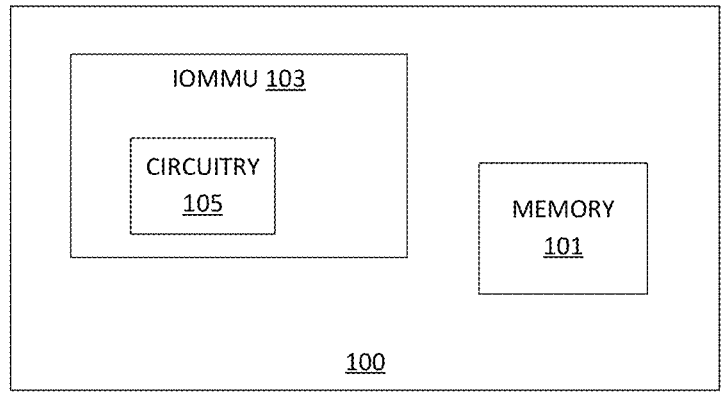
FIG. 1 is a block diagram of an example of an integrated circuit according to an embodiment.
Figure 2A:
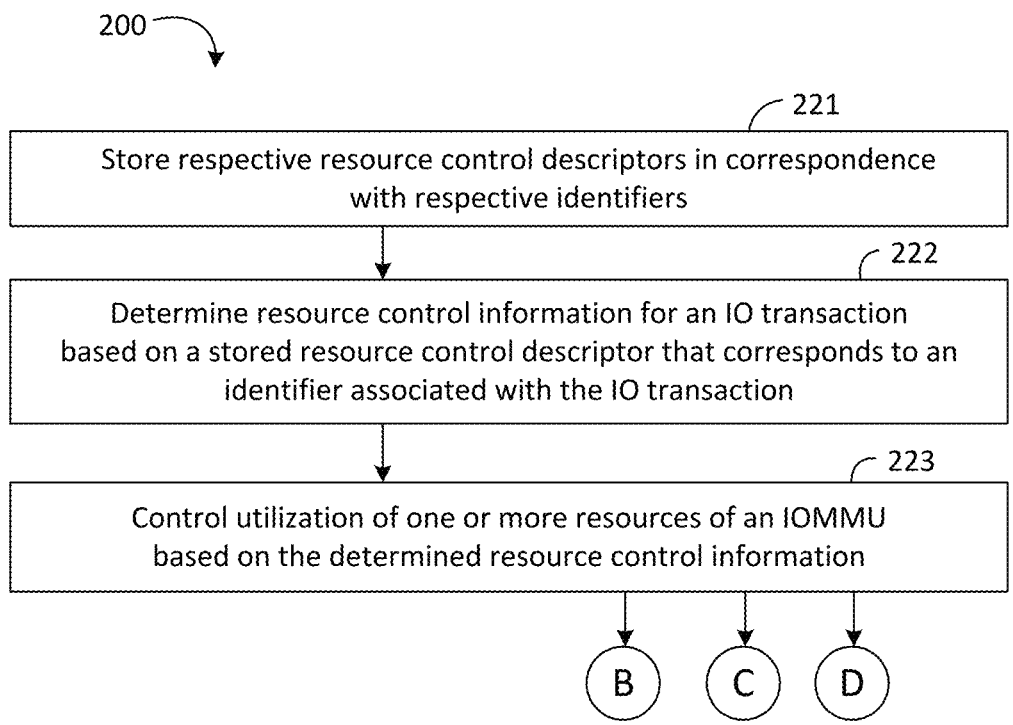
FIGS. 2A to 2D are flow diagrams of an example of a method according to an embodiment.
Figure 2B:
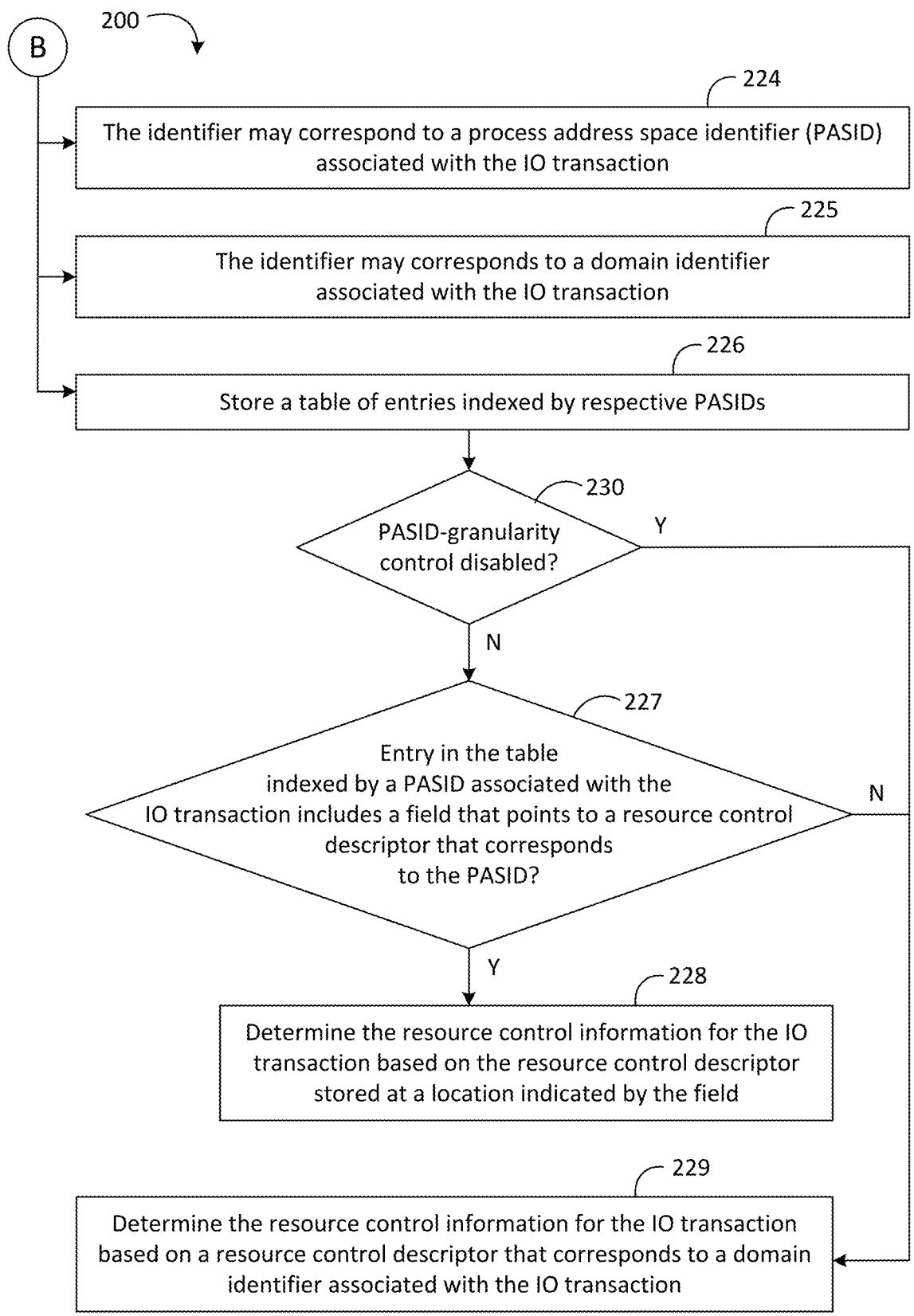
Figure 2C:
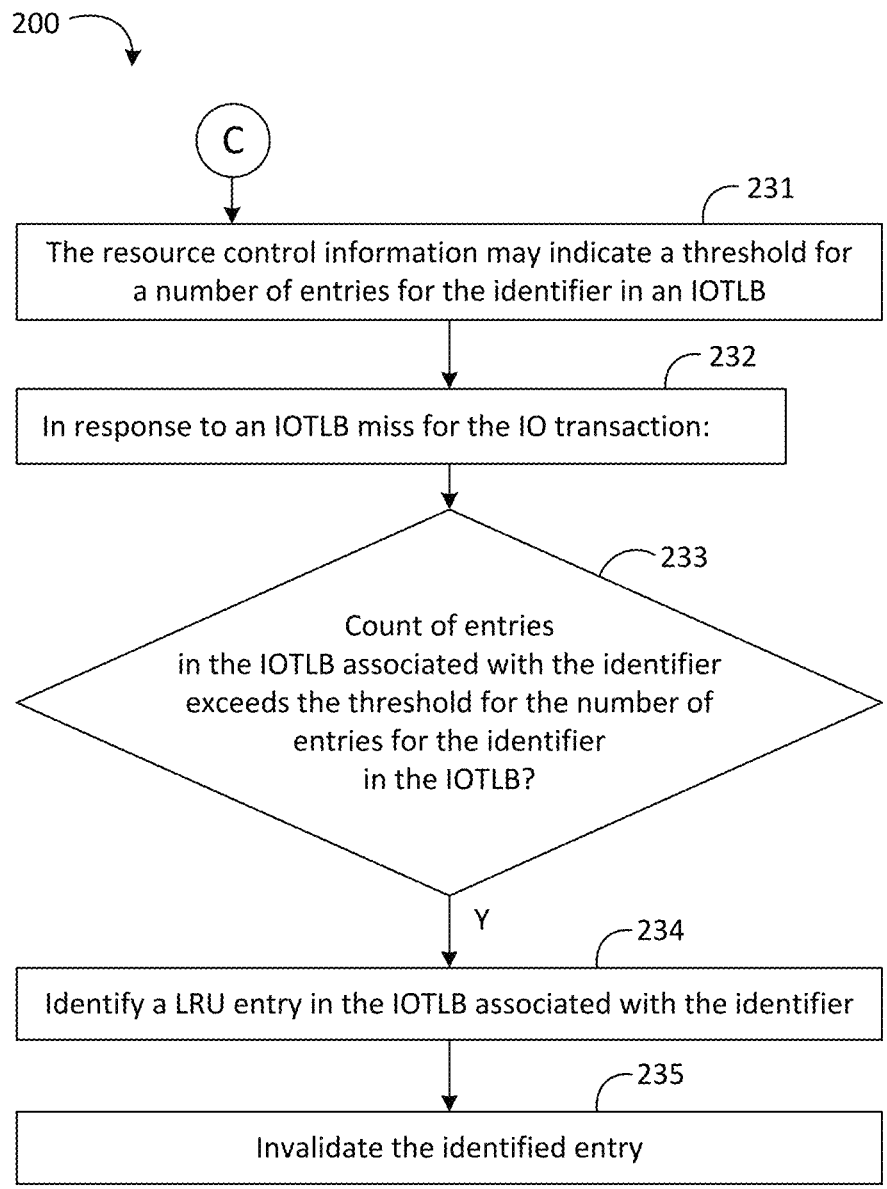
Figure 2D:
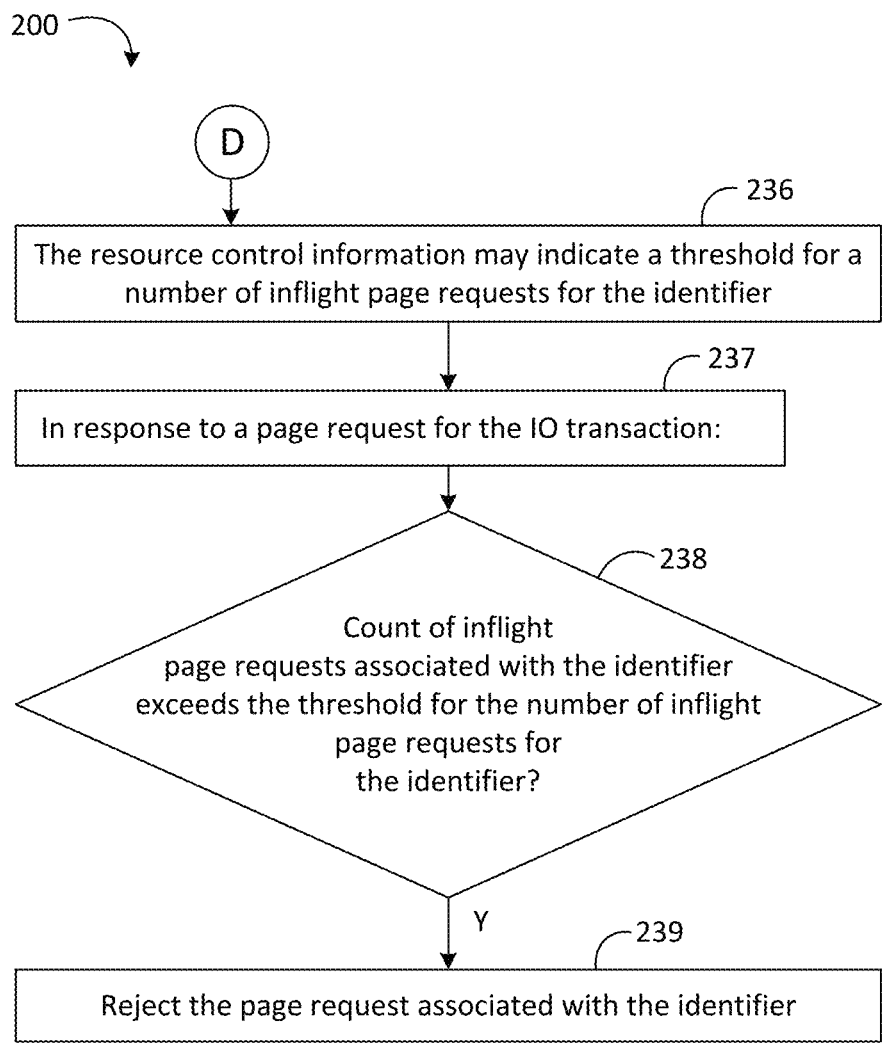

Embodiments discussed herein variously provide techniques and mechanisms for resource control in an input/output (IO) memory management unit (IOMMU). The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide resource control in an IOMMU.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Quality of Service (QoS) is important in a virtualization environment to control/restrict resources that can be used by the virtual machines (VMs) or containers that the tenant owns. Some resources in a server may be shared by different VMs/containers and different QoS requirements may be applied in a manner to provide suitable performance for the tenants and avoid problems from noisy neighbors. Shared resources exist in some computer architectures in all or most layers including, for example, CPU core resources, un-core resources (e.g., IOMMU, L3 cache, internal bus, etc.), and peripheral IO device resources. To ensure equitable allocation of resources in virtualization, QoS policies may be implemented in various components. For example, in IO virtualization, a Virtual Function (VF) (e.g., for single root IO virtualization (SRIOV)) or an Assignable Device Interface (ADI) (e.g., for scalable IO virtualization (Scalable IOV)) may represent a slice of hardware that may implement the QoS per VF/ADI or other granularity. When a hardware slice is assigned to a VM/Container, a hypervisor can use the QoS configuration interface provided by the VF/ADI to control/restrict the shared resource within the IO device utilized by the VM/Container.

In some computer architectures, the IO data-path may include more than just IO devices and the CPU core. An IOMMU may work in conjunction with applications and IO devices to perform IO workloads, providing important functions for virtualization like DMA remapping, IRQ remapping, shared virtual memory, etc. A problem is that the IOMMU provides shared resource/functions that all applications/cores/tenants/devices competitively share, potentially causing contention. For example, IOMMU shared resources may include an IO Translation Lookaside Buffer (IOTLB) for IO/Virtual address translation, a Page Request Service, etc. Some embodiments may provide technology to control/restrict utilization of IOMMU resources on a per process address space identifier (PASID) basis and/or a per domain basis. Advantageously, some embodiments may implement QoS policies within the IOMMU at a PASID granularity, thereby enabling equitable utilization of IOMMU resources and mitigating or preventing problems with noisy neighbors.

With reference to FIG. 1, an embodiment of an integrated circuit 100 may include memory 101 to store respective resource control descriptors in correspondence with respective identifiers, and an IOMMU 103 communicatively coupled to the memory 101. The IOMMU 103 may include circuitry 105 configured to determine resource control information for an IO transaction based on a resource control descriptor stored in the memory 101 that corresponds to an identifier associated with the IO transaction, and control utilization of one or more resources of the IOMMU 103 based on the determined resource control information. For example, the identifier may correspond to a PASID associated with the IO transaction, a domain identifier associated with the IO transaction, etc.

In some embodiments, the memory 101 may also store a table of entries indexed by respective PASIDs, and the circuitry 105 may be configured to determine if an entry in the table indexed by a PASID associated with the IO transaction includes a field that points to a resource control descriptor that corresponds to the PASID, and, if so determined, to determine the resource control information for the IO transaction based on the resource control descriptor stored at a location in the memory 101 indicated by the field. Otherwise, if the entry does not include the field that points to the resource control descriptor, the circuitry 105 may be configured to determine the resource control information for the IO transaction based on a resource control descriptor that corresponds to a domain identifier associated with the IO transaction. In some embodiments, the circuitry 105 may be further configured to determine if PASID-granularity control is disabled, and, if so determined, to determine the resource control information for the IO transaction based on the resource control descriptor that corresponds to the domain identifier associated with the IO transaction (e.g., even if the entry includes the field that points to the resource control descriptor associated with the PASID).

In some embodiments, the resource control information may indicate a threshold for a number of entries for the identifier in an IOTLB and, in response to an IOTLB miss for the IO transaction, the circuitry 105 may be further configured to determine if a count of entries in the IOTLB associated with the identifier exceeds the threshold for the number of entries for the identifier in the IOTLB, and, if so determined, to identify a least recently used (LRU) entry in the IOTLB associated with the identifier and invalidate the identified entry. Additionally, or alternatively, the resource control information may indicate a threshold for a number of inflight page requests for the identifier and, in response to a page request for the IO transaction, the circuitry 105 may be further configured to determine if a count of inflight page requests associated with the identifier exceeds the threshold for the number of inflight page requests for the identifier, and, if so determined, to reject the page request associated with the identifier.

With reference to FIGS. 2A to 2D, an embodiment of a method 200 may include storing respective resource control descriptors in correspondence with respective identifiers at box 221, determining resource control information for an IO transaction based on a stored resource control descriptor that corresponds to an identifier associated with the IO transaction at box 222, and controlling utilization of one or more resources of an IOMMU based on the determined resource control information at box 223. For example, the identifier may correspond to a PASID associated with the IO transaction at box 224, or a domain identifier associated with the IO transaction at box 225 (e.g., or other identifier associated with the IO transaction, such as a stream identifier, etc.).

Some embodiments of the method 200 may further include storing a table of entries indexed by respective PASIDs at box 226, determining if an entry in the table indexed by a PASID associated with the IO transaction includes a field that points to a resource control descriptor that corresponds to the PASID at box 227 and, if so determined, determining the resource control information for the IO transaction based on the resource control descriptor stored at a location indicated by the field at box 228, and, otherwise, determining the resource control information for the IO transaction based on a resource control descriptor that corresponds to a domain identifier associated with the IO transaction at box 229. Prior to box 227, some embodiments of the method 200 may optionally determine if PASID-granularity control is disabled at box 230, and, if so determined, proceed to determining the resource control information for the IO transaction based on the resource control descriptor that corresponds to the domain identifier associated with the IO transaction at box 229.

In some embodiments of the method 200, the resource control information may indicate a threshold for a number of entries for the identifier in an IOTLB at box 231, and, in response to an IOTLB miss for the IO transaction at box 232, the method 200 may further include determining if a count of entries in the IOTLB associated with the identifier exceeds the threshold for the number of entries for the identifier in the IOTLB at box 233, and, if so determined, identifying a LRU entry in the IOTLB associated with the identifier at box 234 and invalidating the identified entry at box 235. Additionally, or alternatively, the resource control information may indicate a threshold for a number of inflight page requests for the identifier at box 236, and, in response to a page request for the IO transaction at box 237, the method 200 may further include determining if a count of inflight page requests associated with the identifier exceeds the threshold for the number of inflight page requests for the identifier at box 238, and, if so determined, rejecting the page request associated with the identifier at box 239.

Figure 3:
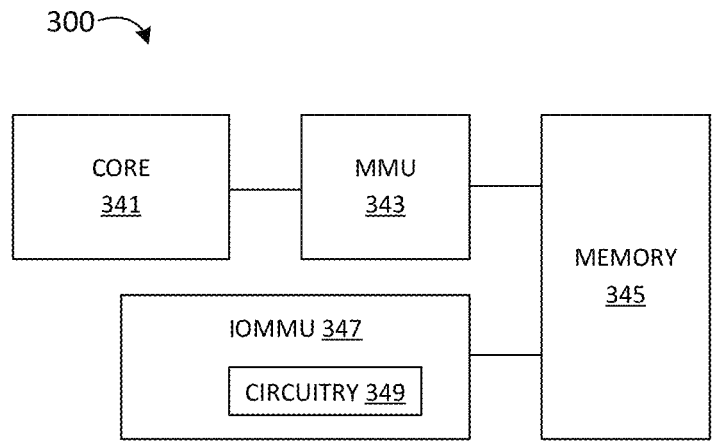
FIG. 3 is a block diagram of an example of an apparatus according to an embodiment.

With reference to FIG. 3, an embodiment of an apparatus 300 may include a core 341, a memory management unit (MMU) 343 communicatively coupled to the core 341, memory 345 communicatively coupled to the MMU 343 to store respective resource control descriptors in correspondence with respective identifiers, and an IOMMU 347 communicatively coupled to the memory 345. The IOMMU 347 may include circuitry 349 to determine resource control information for an IO transaction based on a resource control descriptor stored in the memory 345 that corresponds to an identifier associated with the IO transaction, and control utilization of one or more resources of the IOMMU 347 based on the determined resource control information. For example, the identifier may correspond to a PASID associated with the IO transaction, a domain identifier associated with the IO transaction, etc.

In some embodiments, the memory 345 may also store a table of entries indexed by respective PASIDs, and the circuitry 349 may be configured to determine if an entry in the table indexed by a PASID associated with the IO transaction includes a field that points to a resource control descriptor that corresponds to the PASID, and, if so determined, to determine the resource control information for the IO transaction based on the resource control descriptor stored at a location in the memory 345 indicated by the field. Otherwise, if the entry does not include the field that points to the resource control descriptor, the circuitry 349 may be configured to determine the resource control information for the IO transaction based on a resource control descriptor that corresponds to a domain identifier associated with the IO transaction. In some embodiments, the circuitry 349 may be further configured to determine if PASID-granularity control is disabled, and, if so determined, to determine the resource control information for the IO transaction based on the resource control descriptor that corresponds to the domain identifier associated with the IO transaction (e.g., even if the entry includes the field that points to the resource control descriptor associated with the PASID).

In some embodiments, the resource control information may indicate a threshold for a number of entries for the identifier in an IOTLB and, in response to an IOTLB miss for the IO transaction, the circuitry 349 may be further configured to determine if a count of entries in the IOTLB associated with the identifier exceeds the threshold for the number of entries for the identifier in the IOTLB, and, if so determined, to identify a LRU entry in the IOTLB associated with the identifier and invalidate the identified entry. Additionally, or alternatively, the resource control information may indicate a threshold for a number of inflight page requests for the identifier and, in response to a page request for the IO transaction, the circuitry 349 may be further configured to determine if a count of inflight page requests associated with the identifier exceeds the threshold for the number of inflight page requests for the identifier, and, if so determined, to reject the page request associated with the identifier.

Some embodiments may provide an extension to IOMMU technology for a PASID-granular QoS engine. A conventional IOMMU does not include QoS capabilities that prevents a tenant from overutilizing resources of the IOMMU in a way that might degrade the performance of other tenants and potentially prevent the system from meeting a QoS requirement for the other tenants. Some embodiments may provide IOMMU technology to define QoS at a per PASID granularity or a per domain granularity. Advantageously, some embodiments may provide centralized QoS and flow control at a platform level to maintain performance for all tenants at a desired QoS (e.g., and to prevent one tenant from overutilizing IOMMU resources to the detriment of other tenants). For example, two IOMMU resources that may benefit from such controlled access in accordance with some embodiments include the IOTLB and the Page Request Interface.

Figure 4:
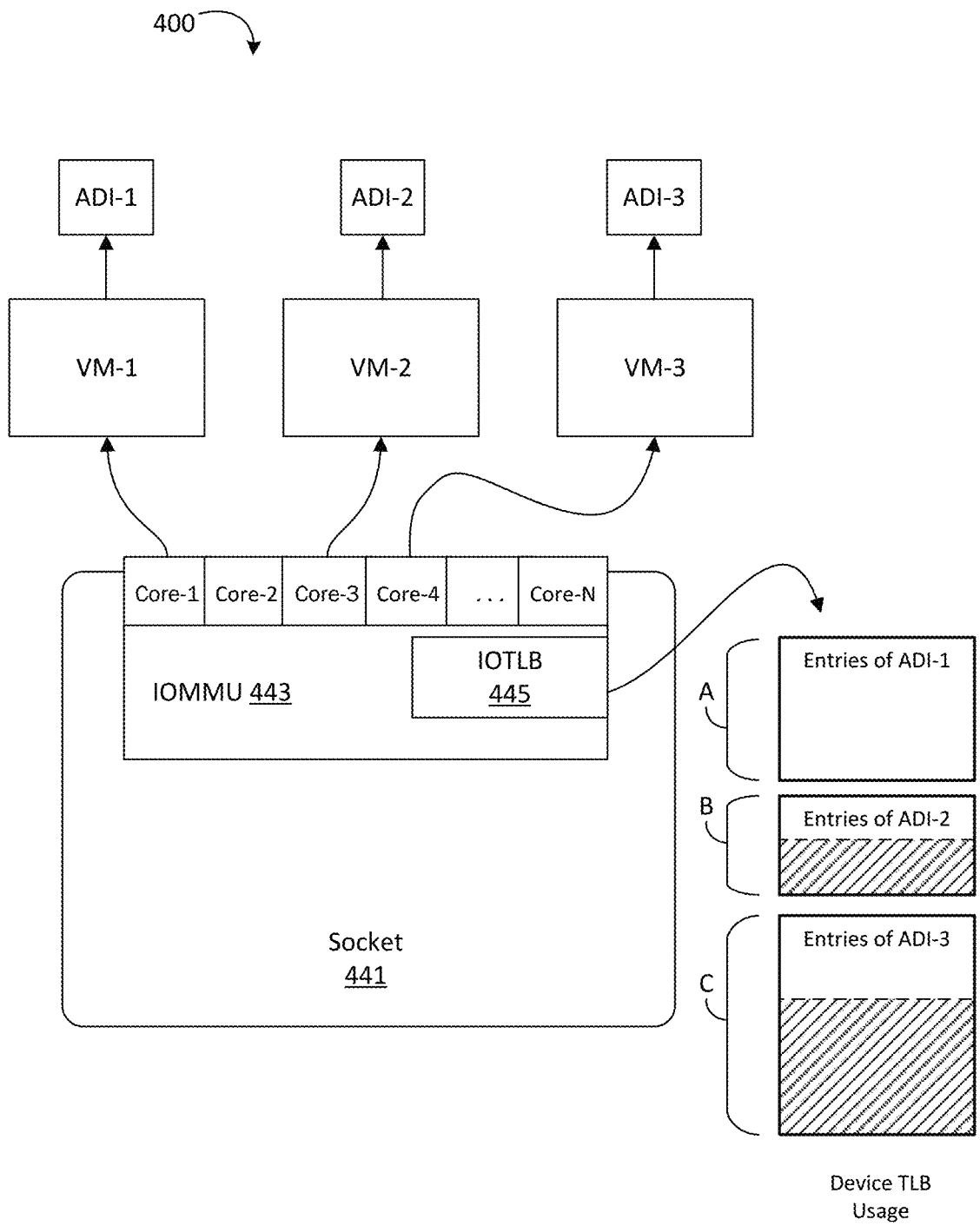
FIG. 4 is a block diagram of an example of a virtualization environment according to an embodiment.

With reference to FIG. 4, an embodiment of a virtualization environment 400 may include a plurality of VMs (VM-1 through VM-3), each with respective ADIs (ADI-1 through ADI-3). A processor device in a socket 441 may include a plurality of cores (Core-1 through Core-N, N>1) coupled to an IOMMU 443. The IOMMU 443 includes an IOTLB that has respective table entries for each of ADI-1, ADI-2, and ADI-3. In a conventional multi-tenant environment, one tenant (e.g., VM-1) may have a chance to overutilize the IOTLB 445 with its device (e.g., ADI-1). An LRU replacement policy in a conventional IOMMU may force eviction of TLB caches used by other VMs, causing extra page table walk and reducing IO performance of other tenants (e.g., that may have higher priority and/or other QoS requirements).

In some embodiments, the IOMMU 443 includes technology to apply respective QoS policies (e.g., on a per PASID or per domain basis) to limit the VMs' utilization of the IOTLB. As illustrated in FIG. 4, the brackets A, B, and C represent respective limits on the number of IOTLB table entries (e.g., where A, B, and C came from respective QoS policies). For example, transactions from each VM may have a unique identifier (e.g., PASID, domain identifier, etc.) that may be utilized to apply the appropriate QoS policy. As illustrated in FIG. 4, the shaded areas next to the respective brackets A, B, and C may represent available entries in the IOTLB 445 for the corresponding ADIs. In this example, ADI-1 has reached the limit for the number of entries in the IOTLB 445 allotted to ADI-1, while ADI-2 and ADI-3 have not. In accordance some embodiments, if ADI-1 requires more entries in the IOTLB 445, existing entries for ADI-1 in the IOTLB 445 are evicted to make room for the new ADI-1 entries. Advantageously, the entries in the IOTLB 445 for ADI-2 and ADI-3 are unaffected. Those skilled in the art will appreciate that, in addition to the IOTLB 445, there are many other caches in the IOMMU 443 (e.g., Page Walk Cache, etc.) that are competitively shared and subject to similar contention and that may benefit from embodiments of resource control for QoS as described herein.

Figure 5:
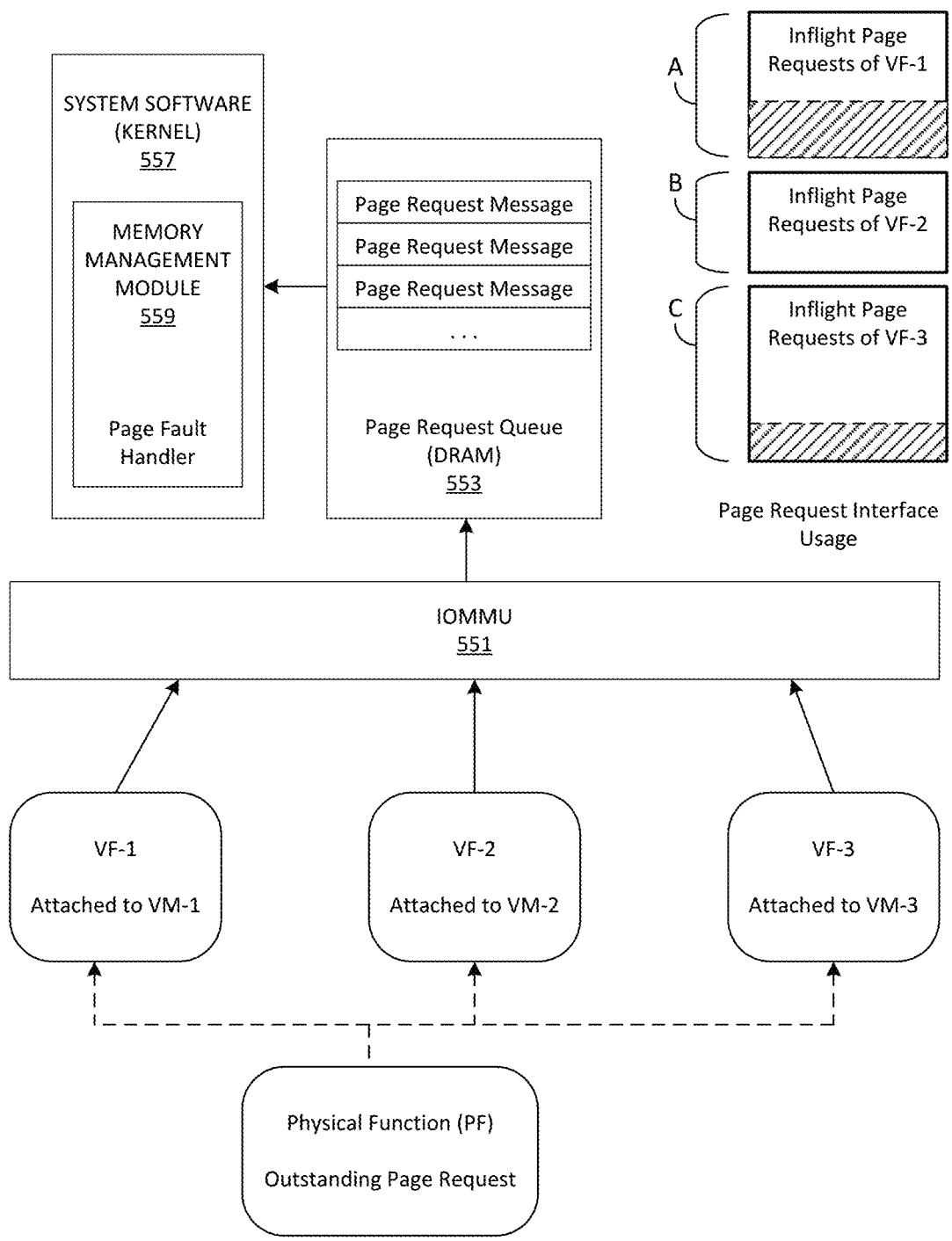
FIG. 5 is a block diagram of another example of a virtualization environment according to an embodiment.

With reference to FIG. 5, an embodiment of a virtualization environment 500 may include a plurality of VFs (VF-1 through VF-3), each attached to respective VMs (VM-1 through VM-3), that send page requests to an IOMMU 551. The IOMMU 551 manages the page requests through messages in a page request queue 553. System software (e.g., a kernel) 557 includes a page fault handler in a memory management module 559 that services the page request queue 553. An example Page Request Interface is defined by PCI-SIG (pci-sig.com) to allow a PCI device interacting with un-pinned system memory for DMA transactions. In the event of page fault (e.g., not allocated yet, or swapped out), the PCI device can send page request message to the IOMMU 551. The IOMMU 551 will raise a page fault request to the system software 557 to recover the memory region so that the PCI device can continue DMA operations. For SR-IOV, PCI-SIG defines that a single Page Request Interface is permitted for a physical function (PF) and the Page Request Interface is shared between the PF and the associated VFs. Moreover, a Page Request specification defines outstanding page request messages that the associated Page Request Interface of the PF physically supports which is shared by the PF and all its deriving VFs.

The number of page requests that can be processed by the IOMMU 551 is limited, and a page request is rejected if the number of inflight page requests from a PF and all its VFs reach a limitation allowed for the physical device. In a conventional multi-tenant environment, one tenant (e.g., VM-2) may have a chance to overutilize the Page Request Interface with its VFs (e.g., VF-2). If a number of inflight page request messages from VF-2 causes the Page Request Interface to reach the limit (e.g., outstanding page request messages) of the PF, page requests sent from VFs belonging to other tenants (e.g., that are sharing the same PF) will be rejected by a conventional IOMMU due to the overflow of inflight page request messages, thereby reducing performance of the other tenants (e.g., which may have higher priority and/or other QoS requirements).

In some embodiments, the IOMMU 551 includes technology to apply respective QoS policies (e.g., on a per PASID or per domain basis) to limit the VFs' utilization of the Page Request Interface. As illustrated in FIG. 5, the brackets A, B, and C represent respective limits on the number of inflight page requests corresponding to respective QoS policies for the VMs/VFs. For example, each VF may have a unique identifier (e.g., PASID, domain identifier, etc.) that may be utilized to apply the appropriate QoS policy. As illustrated in FIG. 5, the shaded areas next to the respective brackets A, B, and C may represent a number of page requests that can be made by the VF before it reaches the limit for the VF. In this example, VF-2 has reached the limit for the number of inflight page requests allotted to VF-2, while VF-1 and VF-3 have not. In accordance some embodiments, if VF-2 issues another page request, the page request is rejected by the IOMMU 551 (e.g., even if the limitation allowed for the physical device is not reached). Advantageously, page requests for VF-1 and VF-3 are unaffected. Those skilled in the art will appreciate that, in addition to the Page Request Interface, there are other resources in the IOMMU 551 that are competitively shared and subject to similar contention and that may benefit from embodiments of resource control for QoS as described herein.

Figure 6:
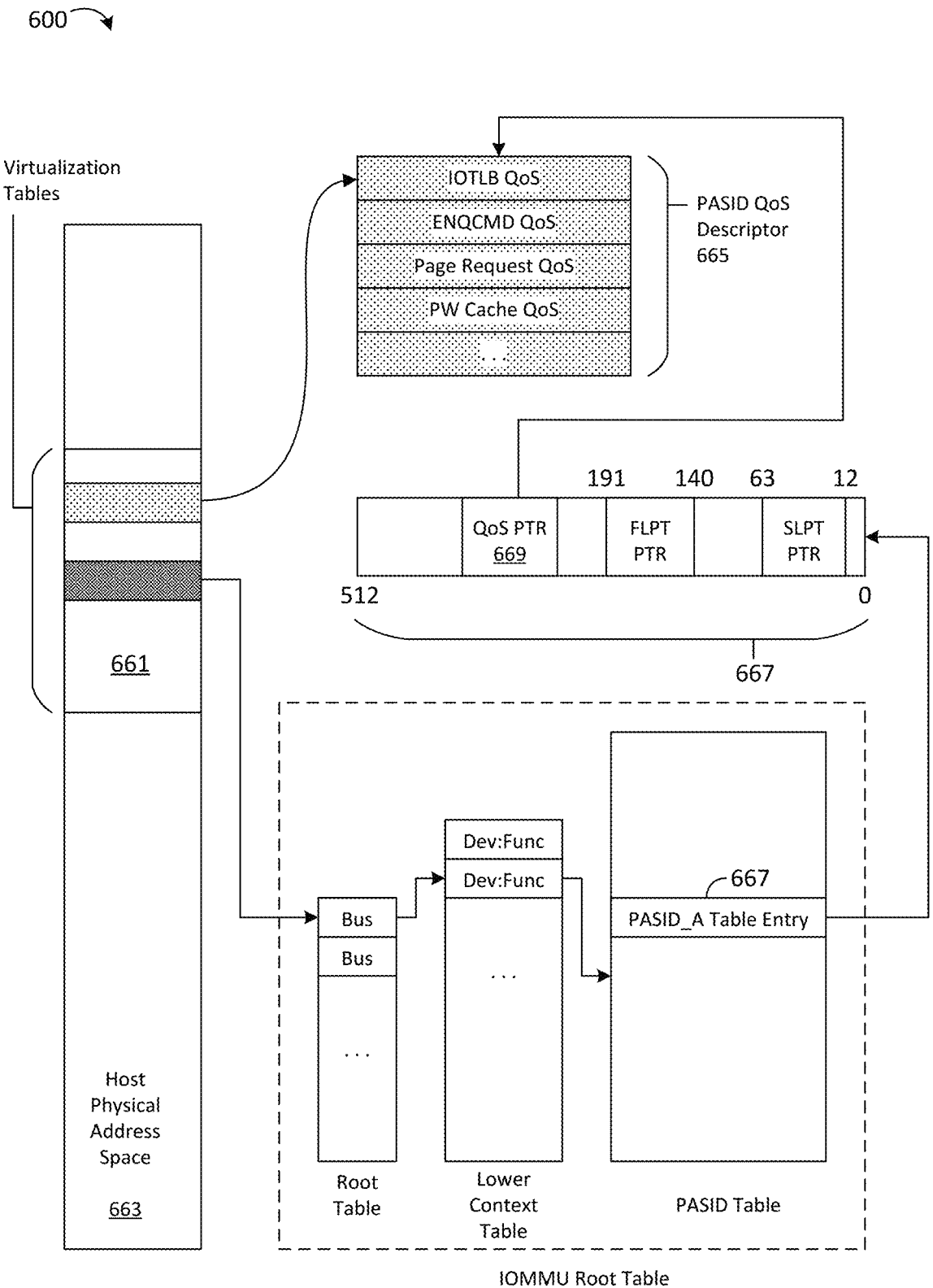
FIG. 6 is a block diagram of another example of a virtualization environment according to an embodiment.

With reference to FIG. 6, an embodiment of a virtualization environment 600 includes virtualization tables 661 stored in system memory 663 (e.g., host physical address space). The virtualization tables 661 include one or more PASID-QoS descriptors 665. For example, the PASID-QoS descriptor 665 is created by a hypervisor in the system memory 663 to specify a compound QoS strategy for a PASID that maps to an application in a host or a VM. Some embodiments expand a Scalable Mode IOMMU PASID table entry structure 667 with an additional field 669, referred to herein as QoS_PTR, that points to the physical address of the PASID-QoS descriptor 665 in the system memory 663. The PASID-QoS descriptor 665 includes QoS settings for multiple shared resources of an IOMMU or CPU, including IOTLB, Page Request, page walk cache, etc. If new shared resources are added to the IOMMU or CPU, QoS settings for such new resources may also be included in the PASID-QoS descriptor 665. In some embodiments (e.g., where an IOMMU may not support Scalable Mode or where a Scalable Mode feature is disabled), a context table may provide a QoS_PTR that points to a more generic DOMAIN-QoS descriptor, that may function in the same manner as a PASID-QoS descriptor. Advantageously, embodiments of an IOMMU and CPU can apply flow control and provide QoS on a per process or per domain basis. Some embodiments provide technology for an IOMMU to reduce or prevent contention for shared resources of the IOMMU/CPU, advantageously limiting overutilization of a resource by one tenant and reducing or preventing cross-tenant or cross-domain performance degradation.

In addition to the data structure expansion for the QoS_PTR 669 and the PASID-QoS descriptor 665 (e.g., or a DOMAIN-QoS descriptor), an embodiment of an IOMMU is configured to implement additional flow control to apply the QoS policies indicated by the QoS descriptors. For example, an IOMMU flow control unit applies the QoS upon receiving an upstream request (e.g., DMA, Page Request Message, etc.) from a PCI device using a PASID-QoS descriptor that corresponds to a PASID in the request.

Figure 7:
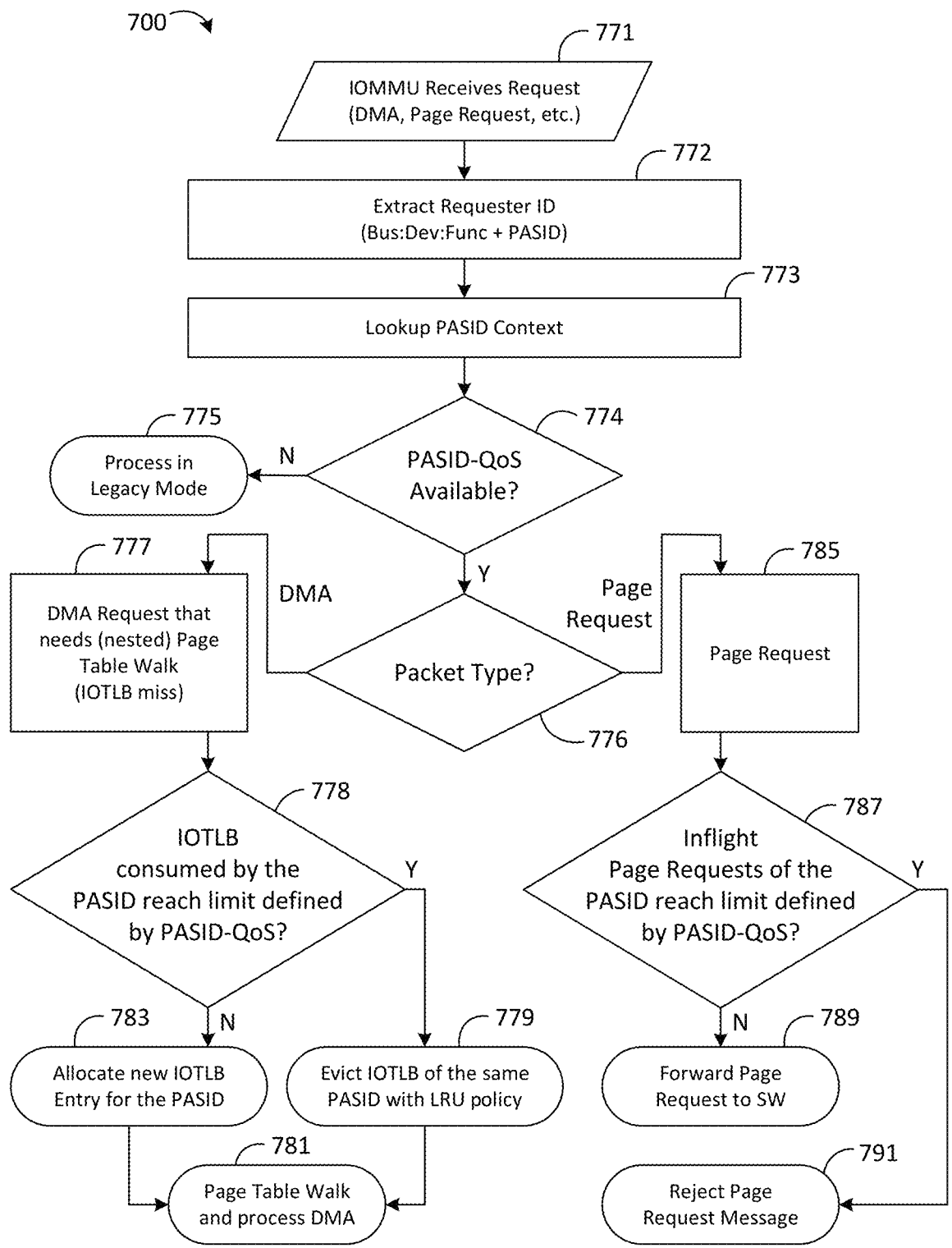
FIG. 7 is a flow diagram of another example of a method according to an embodiment.

With reference to FIG. 7, an embodiment of a method 700 starts with the IOMMU receiving a request (e.g., a DMA request, a page request, etc.) at box 771. When the IOMMU receives an upstream PCI packet, the IOMMU retrieves a requester identifier (ID) including Bus, Device, Function, and PASID information at box 772. The IOMMU then locates a PASID context entry at box 773, using the requester ID (Bus:Dev:Func and PASID).

If the IOMMU determines that no PASID-QoS descriptor is available at box 774 (e.g., and in some embodiments if no DOMAIN-QoS is available), then the method 700 may progress in legacy mode at box 775. Otherwise (e.g., if the PASID context entry contains a QoS_PTR field), the IOMMU retrieves the PASID-QoS descriptor from the location indicated by the QoS_PTR (e.g., from memory, internal cache, etc.). The PASID-QoS descriptor may selectively contain QoS settings for IOTLB, Page Request, etc. The flow control unit in the IOMMU uses the corresponding QoS settings to apply flow control.

The method 700 then includes determining the packet type at box 776. For a DMA request, if the DMA request contains a virtual address (SVM Mode) that does not have corresponding IOTLB entry (e.g., an IOTLB miss), the IOMMU needs to do a page table walk at box 777 to fill the IOTLB. At this point the flow control unit keeps track of how many entries in IOTLB are already consumed by this PASID. If the IOTLB entries consumed by the PASID already reached the limit allowed by this PASID at box 778 (e.g., as defined by PASID-QoS→IOTLB_QoS), the IOMMU invalidates another entry consumed by the same PASID (e.g., using a LRU algorithm) at box 779 and then populates the IOTLB with an entry for the newly translated address at box 781. Otherwise, the IOMMU allocates a new IOTLB entry for the PASID at box 783 (e.g., and increments the count of IOTLB entries consumed by this PASID). Advantageously, embodiments of the method 700 prevent one VM or application from preempting entries in the IOTLB consumed by other VMs or applications.

For a page request at box 785, the method 700 includes determining if the inflight page requests of the PASID already reached a limit defined by the PASID-QoS at box 787. If not, the IOMMU may forward the page request to the software at box 789 (e.g., and increment the count of inflight page requests for the PASID). If the limit is reached at box 787, the IOMMU may reject the page request message at box 791. Those skilled in the art will appreciate that the method 700 may readily be extended to other resources with appropriately configured flow to control utilization of those resources.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 10:
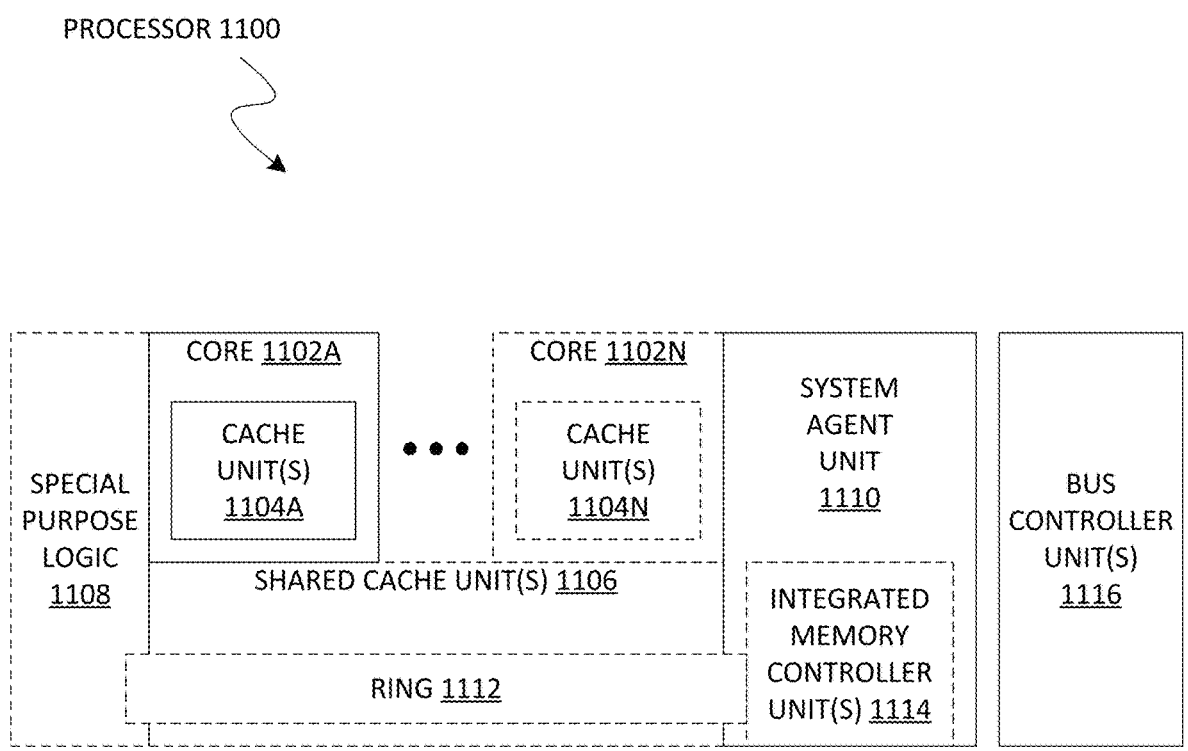
FIG. 10 is a block diagram of a processor that may have more than one core, may have an integrated memory controller, and may have integrated graphics according to embodiments of the invention.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
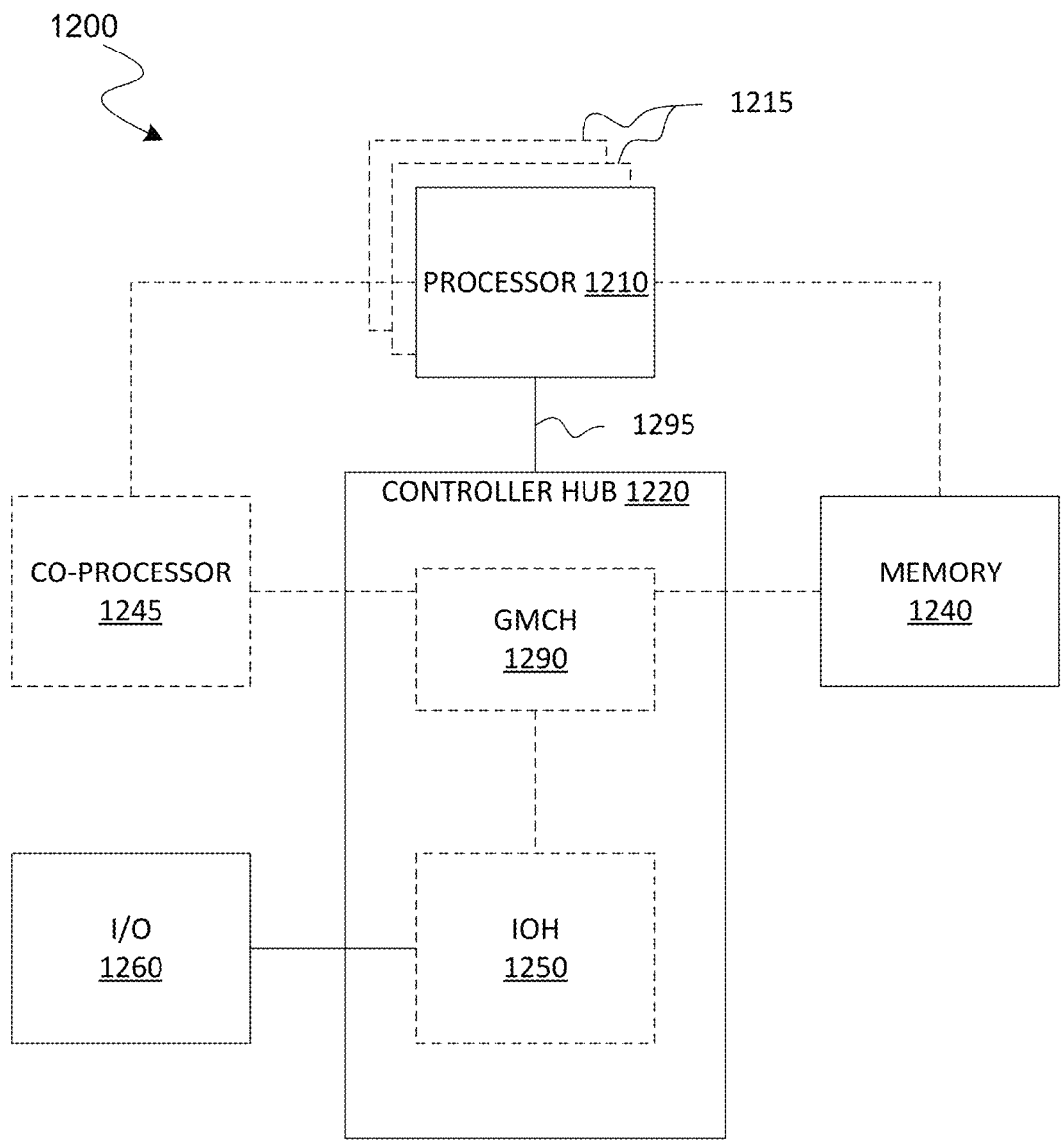
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
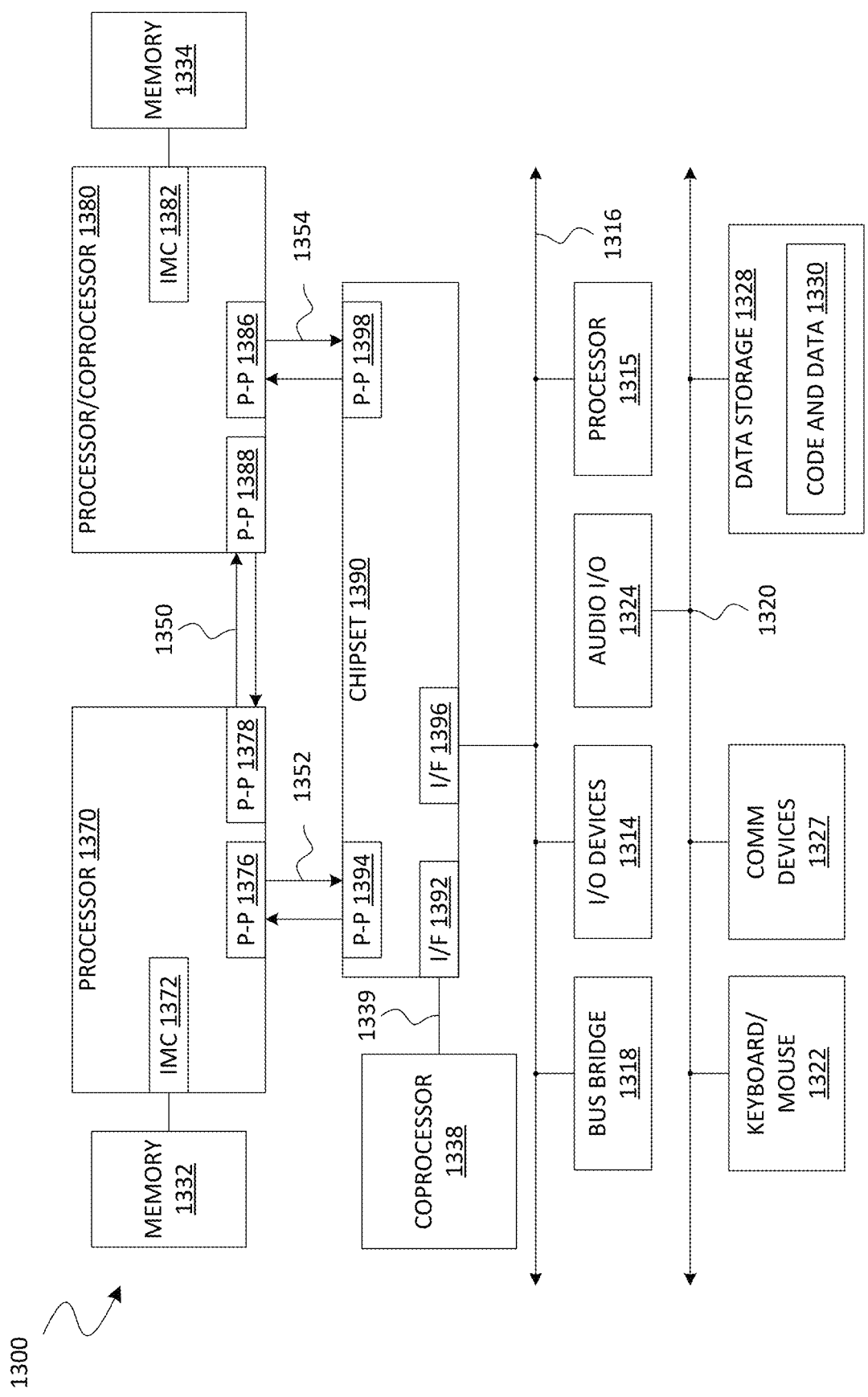

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Figure 13:
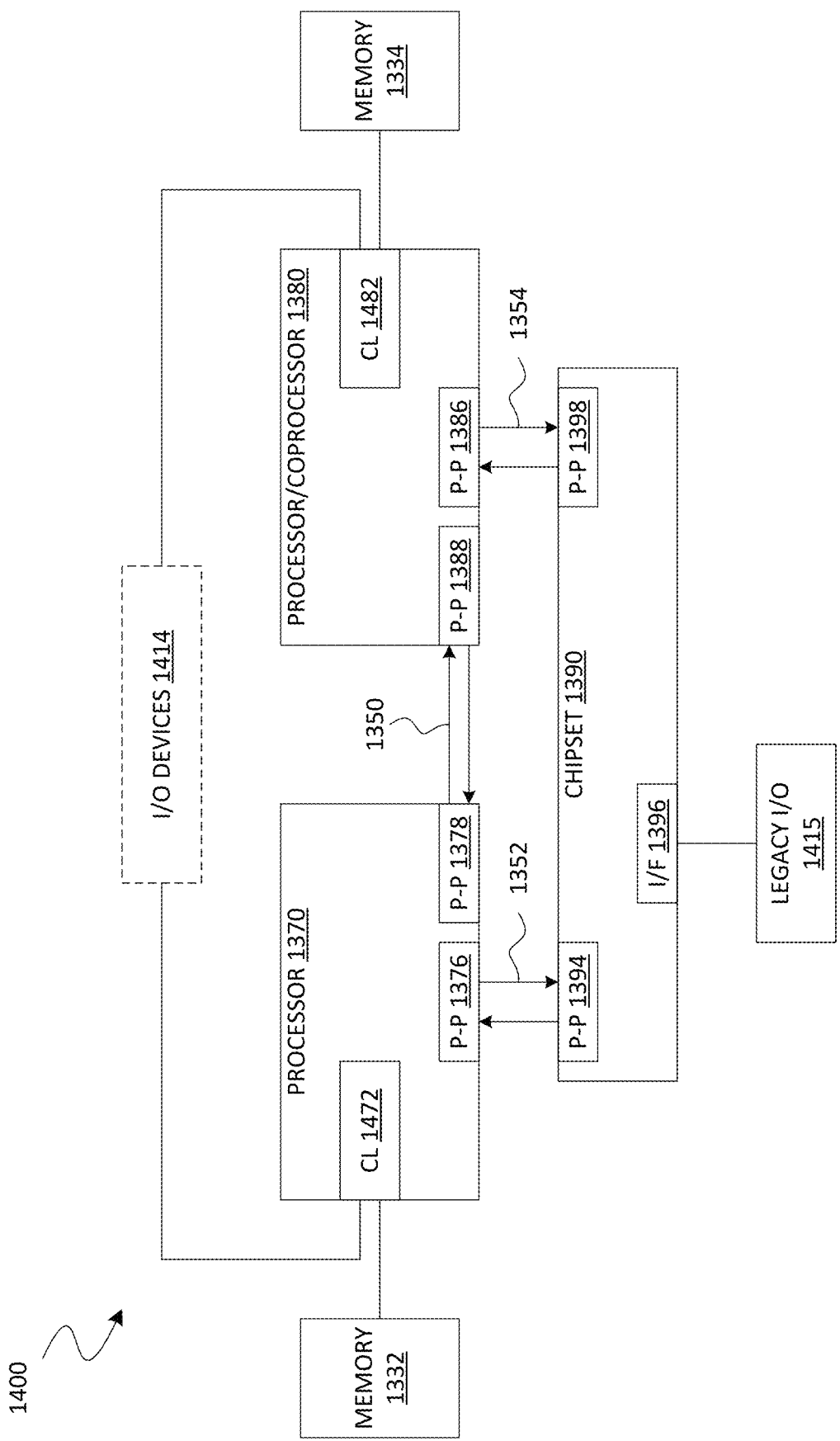

Referring now to FIG. 13, shown is a block diagram of a second more specific exemplary system 1400 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 14:
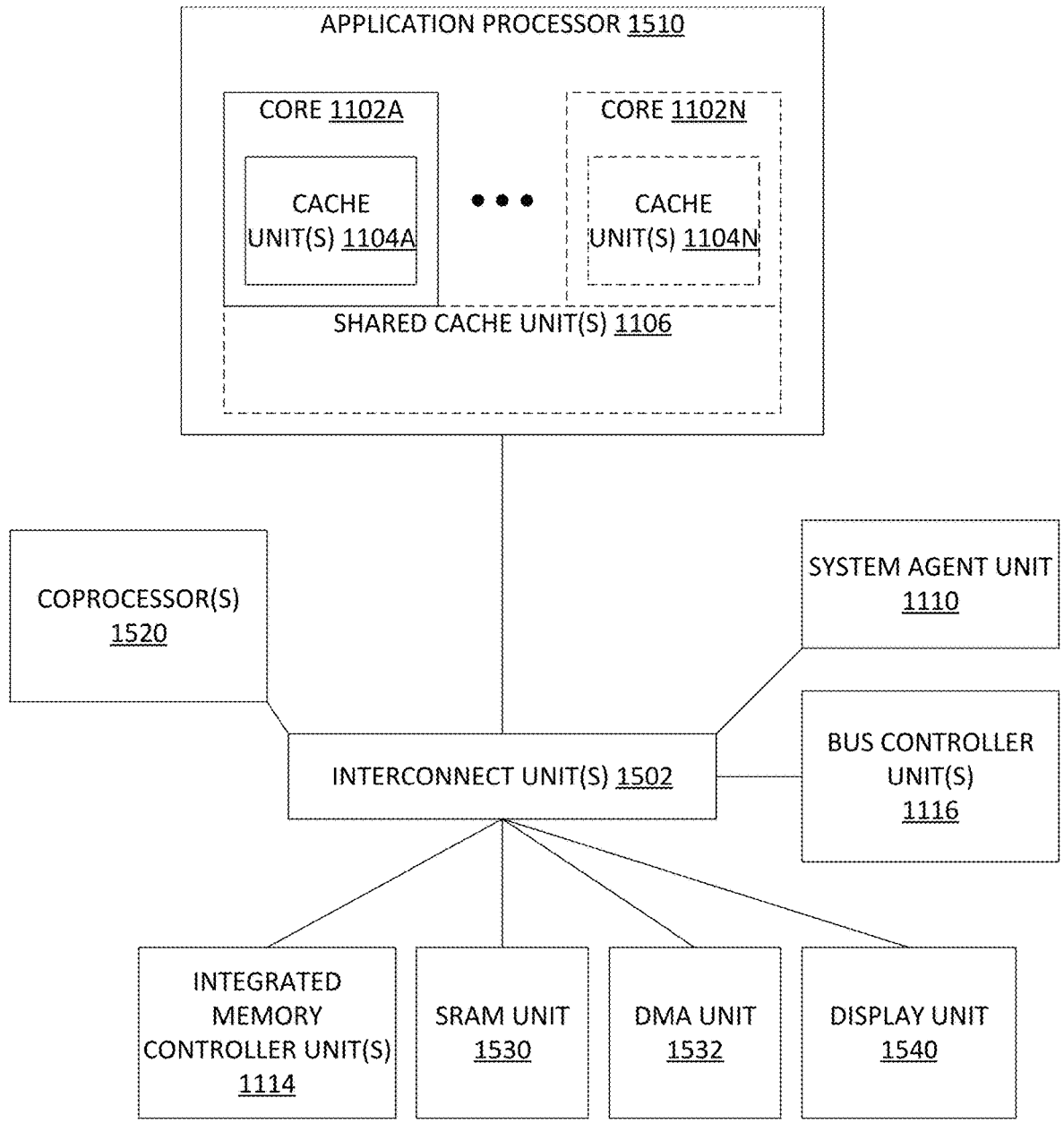

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
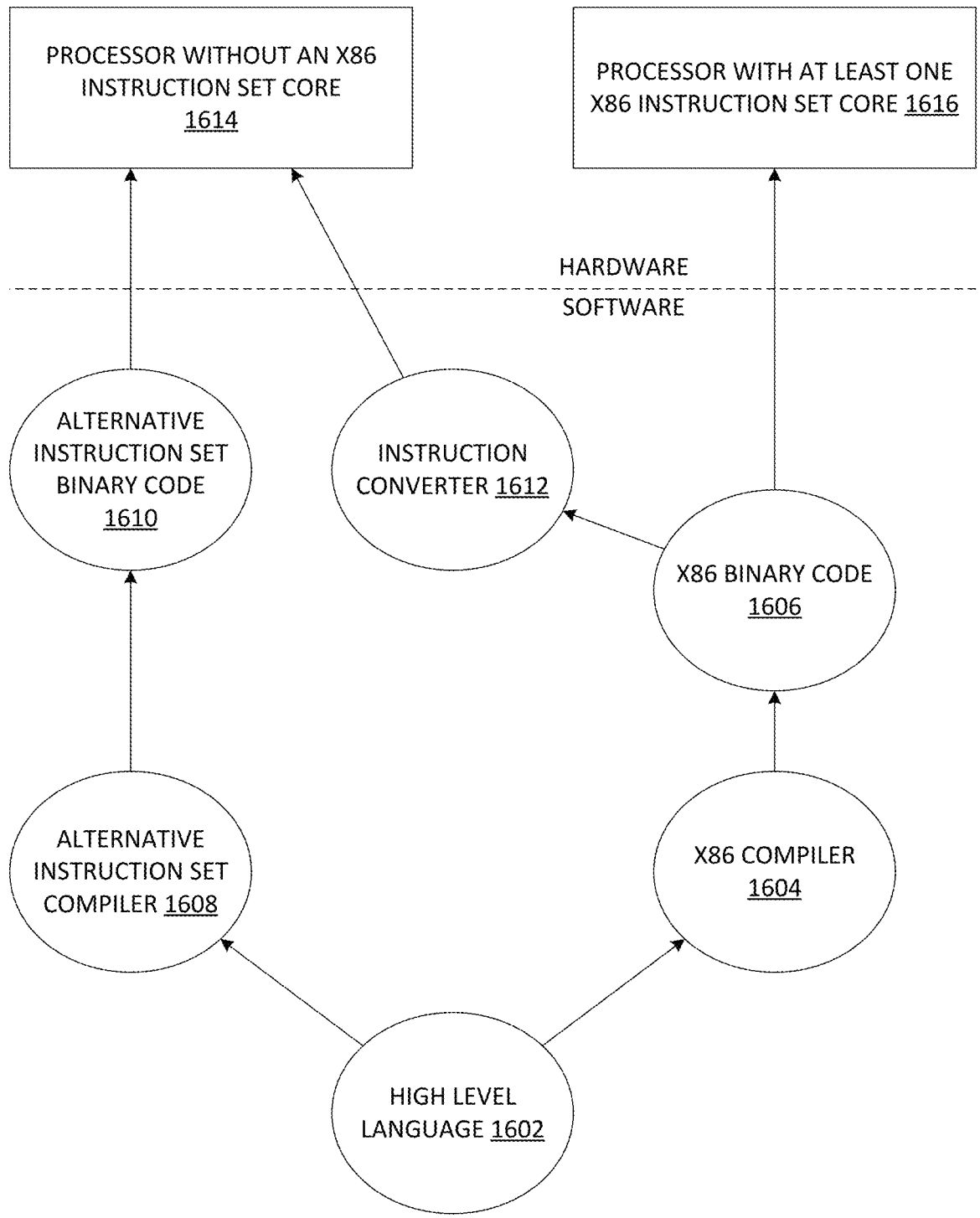
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

ADDITIONAL NOTES AND EXAMPLES

Example 1 includes an integrated circuit, comprising memory to store respective resource control descriptors in correspondence with respective identifiers, and an input/output (IO) memory management unit (IOMMU) communicatively coupled to the memory, the IOMMU including circuitry to determine resource control information for an IO transaction based on a resource control descriptor stored in the memory that corresponds to an identifier associated with the IO transaction, and control utilization of one or more resources of the IOMMU based on the determined resource control information.

Example 2 includes the integrated circuit of Example 1, wherein the identifier corresponds to a process address space identifier (PASID) associated with the IO transaction.

Example 3 includes the integrated circuit of Example 1, wherein the identifier corresponds to a domain identifier associated with the IO transaction.

Example 4 includes the integrated circuit of an of Examples 1 to 3, wherein the memory is further to store a table of entries indexed by respective process address space identifiers (PASIDs), and wherein the circuitry is further to determine if an entry in the table indexed by a PASID associated with the IO transaction includes a field that points to a resource control descriptor that corresponds to the PASID, and, if so determined, determine the resource control information for the IO transaction based on the resource control descriptor stored at a location in the memory indicated by the field, and, otherwise, determine the resource control information for the IO transaction based on a resource control descriptor that corresponds to a domain identifier associated with the IO transaction.

Example 5 includes the integrated circuit of Example 4, wherein the circuitry is further to determine if PASID-granularity control is disabled, and, if so determined, determine the resource control information for the IO transaction based on the resource control descriptor that corresponds to the domain identifier associated with the IO transaction.

Example 6 includes the integrated circuit of any of Examples 1 to 5, wherein the resource control information indicates a threshold for a number of entries for the identifier in an IO translation lookaside buffer (IOTLB), and wherein, in response to an IOTLB miss for the IO transaction, the circuitry is further to determine if a count of entries in the IOTLB associated with the identifier exceeds the threshold for the number of entries for the identifier in the IOTLB, and, if so determined, identify a least recently used entry in the IOTLB associated with the identifier and invalidate the identified entry.

Example 7 includes the integrated circuit of any of Examples 1 to 6, wherein the resource control information indicates a threshold for a number of inflight page requests for the identifier, and wherein, in response to a page request for the IO transaction, the circuitry is further to determine if a count of inflight page requests associated with the identifier exceeds the threshold for the number of inflight page requests for the identifier, and, if so determined, reject the page request associated with the identifier.

Example 8 includes a method, comprising storing respective resource control descriptors in correspondence with respective identifiers, determining resource control information for an input/output (IO) transaction based on a stored resource control descriptor that corresponds to an identifier associated with the IO transaction, and controlling utilization of one or more resources of an IO memory management unit (IOMMU) based on the determined resource control information.

Example 9 includes the method of Example 8, wherein the identifier corresponds to a process address space identifier (PASID) associated with the IO transaction.

Example 10 includes the method of Example 8, wherein the identifier corresponds to a domain identifier associated with the IO transaction.

Example 11 includes the method of any of Examples 8 to 10, further comprising storing a table of entries indexed by respective process address space identifiers (PASIDs), determining if an entry in the table indexed by a PASID associated with the IO transaction includes a field that points to a resource control descriptor that corresponds to the PASID and, if so determined, determining the resource control information for the IO transaction based on the resource control descriptor stored at a location indicated by the field, and, otherwise, determining the resource control information for the IO transaction based on a resource control descriptor that corresponds to a domain identifier associated with the IO transaction.

Example 12 includes the method of Example 11, further comprising determining if PASID-granularity control is disabled, and, if so determined, determining the resource control information for the IO transaction based on the resource control descriptor that corresponds to the domain identifier associated with the IO transaction.

Example 13 includes the method of any of Examples 8 to 12, wherein the resource control information indicates a threshold for a number of entries in an IO translation lookaside buffer (IOTLB) for the identifier, and wherein, in response to an IOTLB miss for the IO transaction, the method further comprises determining if a count of entries in the IOTLB associated with the identifier exceeds the threshold for the number of entries in the IOTLB for the identifier, and, if so determined, identifying a least recently used entry in the IOTLB associated with the identifier and invalidating the identified entry.

Example 14 includes the method of any of Examples 8 to 13, wherein the resource control information indicates a threshold for a number of inflight page requests for the identifier, and wherein, in response to a page request for the IO transaction, the method further comprises determining if a count of inflight page requests associated with the identifier exceeds the threshold for the number of inflight page requests for the identifier, and, if so determined, rejecting the page request associated with the identifier.

Example 15 includes an apparatus, comprising a core, a memory management unit (MMU) communicatively coupled to the core, memory communicatively coupled to the MMU to store respective resource control descriptors in correspondence with respective identifiers, and an input/output (IO) memory management unit (IOMMU) communicatively coupled to the memory, the IOMMU including circuitry to determine resource control information for an IO transaction based on a resource control descriptor stored in the memory that corresponds to an identifier associated with the IO transaction, and control utilization of one or more resources of the IOMMU based on the determined resource control information.

Example 16 includes the apparatus of Example 15, wherein the identifier corresponds to a process address space identifier (PASID) associated with the IO transaction.

Example 17 includes the apparatus of Example 15, wherein the identifier corresponds to a domain identifier associated with the IO transaction.

Example 18 includes the apparatus of any of Examples 15 to 17, wherein the memory is further to store a table of entries indexed by respective process address space identifiers (PASIDs), and wherein the circuitry is further to determine if an entry in the table indexed by a PASID associated with the IO transaction includes a field that points to a resource control descriptor that corresponds to the PASID, and, if so determined, determine the resource control information for the IO transaction based on the resource control descriptor stored at a location in the memory indicated by the field, and, otherwise, determine the resource control information for the IO transaction based on a resource control descriptor that corresponds to a domain identifier associated with the IO transaction.

Example 19 includes the apparatus of Example 18, wherein the circuitry is further to determine if PASID-granularity control is disabled, and, if so determined, determine the resource control information for the IO transaction based on the resource control descriptor that corresponds to the domain identifier associated with the IO transaction.

Example 20 includes the apparatus of any of Examples 15 to 19, wherein the resource control information indicates a threshold for a number of entries for the identifier in an IO translation lookaside buffer (IOTLB), and wherein, in response to an IOTLB miss for the IO transaction, the circuitry is further to determine if a count of entries in the IOTLB associated with the identifier exceeds the threshold for the number of entries for the identifier in the IOTLB, and, if so determined, identify a least recently used entry in the IOTLB associated with the identifier and invalidate the identified entry.

Example 21 includes the apparatus of any of Examples 15 to 20, wherein the resource control information indicates a threshold for a number of inflight page requests for the identifier, and wherein, in response to a page request for the IO transaction, the circuitry is further to determine if a count of inflight page requests associated with the identifier exceeds the threshold for the number of inflight page requests for the identifier, and, if so determined, reject the page request associated with the identifier.

Example 22 includes an apparatus, comprising means for storing respective resource control descriptors in correspondence with respective identifiers, means for determining resource control information for an input/output (IO) transaction based on a stored resource control descriptor that corresponds to an identifier associated with the IO transaction, and means for controlling utilization of one or more resources of an IO memory management unit (IOMMU) based on the determined resource control information.

Example 23 includes the apparatus of Example 22, wherein the identifier corresponds to a process address space identifier (PASID) associated with the IO transaction.

Example 24 includes the apparatus of Example 22, wherein the identifier corresponds to a domain identifier associated with the IO transaction.

Example 25 includes the apparatus of any of Examples 22 to 24, further comprising means for storing a table of entries indexed by respective process address space identifiers (PASIDs), means for determining if an entry in the table indexed by a PASID associated with the IO transaction includes a field that points to a resource control descriptor that corresponds to the PASID and, if so determined, means for determining the resource control information for the IO transaction based on the resource control descriptor stored at a location indicated by the field, and, otherwise, means for determining the resource control information for the IO transaction based on a resource control descriptor that corresponds to a domain identifier associated with the IO transaction.

Example 26 includes the apparatus of Example 25, further comprising means for determining if PASID-granularity control is disabled, and, if so determined, means for determining the resource control information for the IO transaction based on the resource control descriptor that corresponds to the domain identifier associated with the IO transaction.

Example 27 includes the apparatus of any of Examples 22 to 26, wherein the resource control information indicates a threshold for a number of entries in an IO translation lookaside buffer (IOTLB) for the identifier, and wherein, in response to an IOTLB miss for the IO transaction, the apparatus further comprises means for determining if a count of entries in the IOTLB associated with the identifier exceeds the threshold for the number of entries in the IOTLB for the identifier, and, if so determined, means for identifying a least recently used entry in the IOTLB associated with the identifier and invalidating the identified entry.

Example 28 includes the apparatus of any of Examples 22 to 27, wherein the resource control information indicates a threshold for a number of inflight page requests for the identifier, and wherein, in response to a page request for the IO transaction, the apparatus further comprises means for determining if a count of inflight page requests associated with the identifier exceeds the threshold for the number of inflight page requests for the identifier, and, if so determined, means for rejecting the page request associated with the identifier.

Example 29 includes at least one non-transitory machine readable medium comprising a plurality of instructions that, in response to being executed on a computing device, cause the computing device to store respective resource control descriptors in correspondence with respective identifiers, determine resource control information for an input/output (IO) transaction based on a stored resource control descriptor that corresponds to an identifier associated with the IO transaction, and control utilization of one or more resources of an IO memory management unit (IOMMU) based on the determined resource control information.

Example 30 includes the at least one non-transitory machine readable medium of Example 29, wherein the identifier corresponds to a process address space identifier (PASID) associated with the IO transaction.

Example 31 includes the at least one non-transitory machine readable medium of Example 29, wherein the identifier corresponds to a domain identifier associated with the IO transaction.

Example 32 includes the at least one non-transitory machine readable medium of any of Examples 29 to 31, comprising a plurality of further instructions that, in response to being executed on the computing device, cause the computing device to store a table of entries indexed by respective process address space identifiers (PASIDs), determine if an entry in the table indexed by a PASID associated with the IO transaction includes a field that points to a resource control descriptor that corresponds to the PASID and, if so determined, determine the resource control information for the IO transaction based on the resource control descriptor stored at a location indicated by the field, and, otherwise, determine the resource control information for the IO transaction based on a resource control descriptor that corresponds to a domain identifier associated with the IO transaction.

Example 33 includes the at least one non-transitory machine readable medium of Example 32, comprising a plurality of further instructions that, in response to being executed on the computing device, cause the computing device to determine if PASID-granularity control is disabled, and, if so determined, determine the resource control information for the IO transaction based on the resource control descriptor that corresponds to the domain identifier associated with the IO transaction.

Example 34 includes the at least one non-transitory machine readable medium of any of Examples 29 to 33, wherein the resource control information indicates a threshold for a number of entries in an IO translation lookaside buffer (IOTLB) for the identifier, and wherein, in response to an IOTLB miss for the IO transaction, the at least one non-transitory machine readable medium comprises a plurality of further instructions that, in response to being executed on the computing device, cause the computing device to determine if a count of entries in the IOTLB associated with the identifier exceeds the threshold for the number of entries in the IOTLB for the identifier, and, if so determined, identify a least recently used entry in the IOTLB associated with the identifier and invalidate the identified entry.

Example 35 includes the at least one non-transitory machine readable medium of any of Examples 29 to 34, wherein the resource control information indicates a threshold for a number of inflight page requests for the identifier, and wherein, in response to a page request for the IO transaction, the at least one non-transitory machine readable medium comprises a plurality of further instructions that, in response to being executed on the computing device, cause the computing device to determine if a count of inflight page requests associated with the identifier exceeds the threshold for the number of inflight page requests for the identifier, and, if so determined, reject the page request associated with the identifier.

Techniques and architectures for per process or per domain granularity resource control for an IOMMU are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
   memory to store:
   one or more virtualization tables comprising resource control descriptors which each correspond to one of a respective process address space identifier (PASID) or a respective domain identifier, the resource control descriptors each to identify a respective one or more quality of service (QOS) requirements; and
   a table comprising a first plurality of entries each indexed by a respective PASID; and
   an input/output (IO) memory management unit (IOMMU) communicatively coupled to the memory, the IOMMU including circuitry to:
   receive an indication of an IO transaction which is to access one or more shared resources;
   determine, based on the indication, an identifier of a requester of the IO transaction;
   perform a search of the table based on the identifier of the requester, to identify a first entry of the first plurality of entries;
   perform an evaluation to determine whether the first entry includes a field that is to provide a pointer to a resource control descriptor;
   where the evaluation determines that the first entry includes the field:
   determine, based on a value at the field, a first one or more QoS requirements identified by one of the resource control descriptors; and
   control a performance of the IO transaction according to the first one or more QoS requirements; and
   where the evaluation fails to determine that the first entry includes the field:
   determine, based on a domain identifier which corresponds to the requester, a second one or more QoS requirements identified by another of the resource control descriptors; and
   control the performance of the IO transaction according to the second one or more QoS requirements.

2. The integrated circuit of claim 1, wherein the first one or more QoS requirements comprises multiple one or more QoS requirements.

3. The integrated circuit of claim 1, wherein the identifier of the requester comprises a bus number, a device number, and a function number, and a PASID number.

4. The integrated circuit of claim 1, wherein the circuitry is to:
   determine if a PASID-granularity control is disabled; and, if so determined,
   determine the second one or more QoS requirements based on the domain identifier.

5. The integrated circuit of claim 1, wherein the first one or more QoS requirements comprise a threshold for a number of entries for the identifier in an IO translation lookaside buffer (IOTLB), and wherein, in response to an IOTLB miss for the IO transaction, the circuitry is further to:
   determine if a count of entries in the IOTLB associated with the identifier exceeds the threshold for the number of entries for the identifier in the IOTLB; and, if so determined,
   identify a least recently used entry in the IOTLB associated with the identifier and invalidate the identified entry.

6. The integrated circuit of claim 1, wherein the first one or more QoS requirements comprise a threshold for a number of inflight page requests for the identifier, and wherein, in response to a page request for the IO transaction, the circuitry is further to:
   determine if a count of inflight page requests associated with the identifier exceeds the threshold for the number of inflight page requests for the identifier; and, if so determined,
   reject the page request associated with the identifier.

7. A method, comprising:
   storing one or more virtualization tables comprising resource control descriptors which each correspond to one of a respective process address space identifier (PASID) or a respective domain identifier, the resource control descriptors each to identify a respective one or more quality of service (QOS) requirements;
   storing a table comprising a first plurality of entries each indexed by a respective PASID;
   receiving an indication of an input/output (IO) transaction which is to access one or more shared resources;
   determining, based on the indication, an identifier of a requester of the IO transaction;
   performing a search of an IO memory management unit (IOMMU) table, based on identifier of the requester, to identify a first entry of the first plurality of entries;
   performing an evaluation to determine whether the first entry includes a field that is to provide a pointer to a resource control descriptor;
   where the evaluation determines that the first entry includes the field:
   determining, based on a value at the field, a first one or more QoS requirements identified by one of the resource control descriptors; and
   controlling a performance of the IO transaction according to the first one or more QoS requirements; and
   where the evaluation fails to determine that the first entry includes the field:
   determining, based on a domain identifier which corresponds to the requester, a second one or more QoS requirements identified by another of the resource control descriptors; and
   controlling the performance of the IO transaction according to the second one or more QoS requirements.

8. The method of claim 7, wherein the first one or more QoS requirements comprises multiple one or more QoS requirements.

9. The method of claim 7, wherein the identifier of the requester comprises a bus number, a device number, and a function number, and a PASID number.

10. The method of claim 7, further comprising:
    determining if a PASID-granularity control is disabled; and, if so determined,
    determining the second one or more QoS requirements based on the domain identifier.

11. The method of claim 7, wherein the first one or more QoS requirements comprise a threshold for a number of entries in an IO translation lookaside buffer (IOTLB) for the identifier, and wherein, in response to an IOTLB miss for the IO transaction, the method further comprises:
  determining if a count of entries in the IOTLB associated with the identifier exceeds the threshold for the number of entries in the IOTLB for the identifier; and, if so determined,
  identifying a least recently used entry in the IOTLB associated with the identifier and invalidating the identified entry.

12. The method of claim 7, wherein the first one or more QoS requirements comprise a threshold for a number of inflight page requests for the identifier, and wherein, in response to a page request for the IO transaction, the method further comprises:
  determining if a count of inflight page requests associated with the identifier exceeds the threshold for the number of inflight page requests for the identifier; and, if so determined,
  rejecting the page request associated with the identifier.

13. An apparatus, comprising:
  a core;
  a memory management unit (MMU) communicatively coupled to the core;
  memory communicatively coupled to the MMU to store:
    one or more virtualization tables comprising resource control descriptors which each correspond to one of a respective process address space identifier (PASID) or a respective domain identifier, the resource control descriptors each to identify a respective one or more quality of service (QOS) requirements; and
    a table comprising a first plurality of entries each indexed by a respective PASID; and
  an input/output (IO) memory management unit (IOMMU) communicatively coupled to the memory, the IOMMU including circuitry to:
    receive an indication of an IO transaction which is to access one or more shared resources;
    determine, based on the indication, an identifier of a requester of the IO transaction;
    perform a search of the table based on the identifier of the requester, to identify a first entry of the first plurality of entries;
    perform an evaluation to determine whether the first entry includes a field that is to provide a pointer to a resource control descriptor;
    where the evaluation determines that the first entry includes the field:
      determine, based on a value at the field, a first one or more QoS requirements identified by one of the resource control descriptors; and
      control a performance of the IO transaction according to the first one or more QoS requirements; and
    where the evaluation fails to determine that the first entry includes the field:
      determine, based on a domain identifier which corresponds to the requester, a second one or more QoS requirements identified by another of the resource control descriptors; and
      control the performance of the IO transaction according to the second one or more QoS requirements.

14. The apparatus of claim 13, wherein the first one or more QoS requirements comprises multiple one or more QoS requirements.

15. The apparatus of claim 13, wherein the identifier of the requester comprises a bus number, a device number, and a function number, and a PASID number.

16. The apparatus of claim 13, wherein the circuitry is to:
  determine if a PASID-granularity control is disabled; and, if so determined,
  determine the second one or more QoS requirements based on the domain identifier.

17. The apparatus of claim 13, wherein the first one or more QoS requirements comprise a threshold for a number of entries for the identifier in an IO translation lookaside buffer (IOTLB), and wherein, in response to an IOTLB miss for the IO transaction, the circuitry is further to:
  determine if a count of entries in the IOTLB associated with the identifier exceeds the threshold for the number of entries for the identifier in the IOTLB; and, if so determined, identify a least recently used entry in the IOTLB associated with the identifier and invalidate the identified entry.

* * * * *